United States Patent
Aoki et al.

(10) Patent No.: US 8,349,603 B2
(45) Date of Patent: Jan. 8, 2013

(54) CANTILEVER FOR MEASURING INTRA-CELLULAR AND INTER-CELLULAR MICROSPACES

(75) Inventors: Yukihiro Aoki, Okaya (JP); Shinichi Shikata, Tsukuba (JP); Hiroshi Uetsuka, Tsukuba (JP); Chikashi Nakamura, Chofu (JP); Nobuo Shimamoto, Mishima (JP)

(73) Assignees: Olympus Corporation, Tokyo (JP); Research Organization of Information and Systems, Tokyo (JP)

(*) Notice: Subject to any disclaimer, the term of this patent is extended or adjusted under 35 U.S.C. 154(b) by 167 days.

(21) Appl. No.: 12/902,544

(22) Filed: Oct. 12, 2010

(65) Prior Publication Data

US 2011/0027872 A1 Feb. 3, 2011

Related U.S. Application Data

(63) Continuation of application No. 11/943,089, filed on Nov. 20, 2007.

(30) Foreign Application Priority Data

Feb. 19, 2007 (JP) ................................. 2007-038446

(51) Int. Cl.
*C12M 1/34* (2006.01)
(52) U.S. Cl. ............... 435/287.1; 435/287.2; 73/661
(58) Field of Classification Search ............... 435/287.1, 435/287.2; 108/108; 116/275; 174/661; 324/755.07; 438/52; 977/732; 73/661
See application file for complete search history.

(56) References Cited

U.S. PATENT DOCUMENTS

| 5,838,005 | A | 11/1998 | Majumdar et al. |
|---|---|---|---|
| 5,929,438 | A | 7/1999 | Suzuki et al. |
| 7,115,863 | B1 | 10/2006 | Ishibashi et al. |
| 2003/0228695 | A1 | 12/2003 | Nakamura et al. |

FOREIGN PATENT DOCUMENTS

| JP | 2001-062791 | 3/2001 |
|---|---|---|
| JP | 2003-003174 | 1/2003 |
| JP | 2003-325161 | 11/2003 |
| JP | 2005-170959 | 6/2005 |
| JP | 2006-058255 | 3/2006 |
| JP | 2006-166884 | 6/2006 |
| JP | 2006-246731 | 9/2006 |
| WO | WO 2006/106818 | 10/2006 |
| WO | WO 2007/047337 A2 | 4/2007 |

OTHER PUBLICATIONS

Official Action, mailed Mar. 15, 2011, from the Japan Patent Office in counterpart Japanese Patent Application No. 2007-038446, together with a partial English language translation.

*Primary Examiner* — Michael Hobbs
(74) *Attorney, Agent, or Firm* — Scully, Scott, Murphy & Presser, P.C.

(57) ABSTRACT

A cantilever for measuring intra-cellular and inter-cellular microspaces of the present invention includes a support portion, a lever portion provided to the support portion so as to protrude therefrom, and a probe portion provided near a free end of the lever portion. The probe portion includes a conductive probe made of a carbon-based material, and an insulating film to coat a periphery of the conductive probe.

6 Claims, 16 Drawing Sheets

CANTILEVER FOR MEASURING INTRA-CELLULAR AND INTER-CELLULAR MICROSPACES

CROSS-REFERENCE TO RELATED APPLICATION

This application is a continuation of U.S. Ser. No. 11/943,089, filed Nov. 20, 2007 which claims benefit of Japanese Application No. 2007-38446 filed in Japan on Feb. 19, 2007, the entire contents of which are incorporated herein by reference.

BACKGROUND OF THE INVENTION

1. Field of the Invention

The present invention relates to a cantilever for measuring intra-cellular and inter-cellular microspaces suitable for measurement or operation in intra-cellular and inter-cellular microspaces.

2. Related Art Statement

In recent years of bio-field, there has been focused on elucidating or controlling cellular vital functions.

Such elucidation or control of cellular vital functions involves essential operations such as measuring electric potential difference in intra-cellular and inter-cellular microspaces and introducing and taking a gene or the like into and out of a cell.

A number of suggestions have been made on method or device for introducing into a cell a substance to be introduced such as a gene. Known examples of such suggestions include disclosures in Japanese Unexamined Patent Publication Nos. 2003-325161 and 2006-166884.

The Japanese Unexamined Patent Publication No. 2003-325161 describes a suggestion on a cell operating device and a cell operating method using the cell operating device. This publication discloses a technique on a configuration which is capable of detailed real-time observation of serial dynamics changes shown on the cell during an interval from introduction to manifestation of a gene, which is applicable even for elucidating or controlling cell differentiation, and which further includes a probe of an Atomic Force Microscope (AFM) which is provided, as cell operative means capable of minimizing cellular damage during introduction of a gene or the like, with a needle-shaped matter for inserting into a cell a substance relating to gene or gene manifestation which is fixed thereto.

However, the technique described in the Japanese Unexamined Patent Publication No. 2003-325161 has a problem in that the substance relating to gene or gene manifestation remains fixed to the needle-shaped matter, so that the gene or the like is not constantly held in the cell when the needle is pulled out, resulting in incapability of producing a gene recombinant.

A proposal in view of such problem is made in Japanese Unexamined Patent Publication No. 2006-166884, which describes a proposal on a method to introduce a substance into a cell.

The Japanese Unexamined Patent Publication No. 2006-166884 discloses a technique regarding a method for introducing into a cell a substance to be introduced, by binding the substance to be introduced to a needle-shaped material by means of an intermediate binding force such that the substance to be introduced is caused to remain in the cell when the needle-shaped material is punctured thereinto. This publication also discloses a technique relating to a configuration in which an atomic force microscope (AFM) is used for a method of detecting puncture of the needle-shaped material into the cell and as an introducing device for introducing the substance to be introduced into the cell.

Specifically, in the method described in the Japanese Unexamined Patent Publication No. 2006-166884, as shown in FIG. 21, a probe 101 provided to an AFM cantilever 100 is etched by a focused ion beam so as to be configured as a needle-shaped material, and further, the probe 101 as the needle-shaped material is used to perform a puncturing operation into a cell 103 and a nucleus 104 in the cell 103.

The Japanese Unexamined Patent Publication No. 2006-166884 also discloses a technique related to electrostatic coupling as a method to couple the substance to be introduced to the needle-shaped material by means of an intermediate binding force. Because such electrostatic coupling is a weak coupling, the substance to be introduced can be easily separated in the cell. In electrostatic coupling, cationic polymer is generally used.

Specifically, in the method described in the Japanese Unexamined Patent Publication No. 2006-166884, as shown in a schematic block diagram of FIG. 22, a thiol group is introduced into a needle-shaped material 105, which is a silicon-made AFM probe etched to have a sharpened edge, to modify succinimide active ester on a surface of needle-shaped material to immobilize polylysine followed by electrostatic coupling of plasmid phrGFP as the substance to be introduced, before introducing the needle-shaped material 105 into the cell.

However, the technique described in the Japanese Unexamined Patent Publication No. 2006-166884 has a problem in that the electrostatic coupling, which is weak, can be canceled, resulting in the substance to be introduced to be detached before introduction into the cell, thus making it impossible to introduce a desired material into the cell.

Further, the techniques described in the Japanese Unexamined Patent Publication No. 2006-166884 suggests or discloses nothing in terms of taking a substance out of a cell and measuring intra-cellular electric potential distribution. Accordingly, there is desired a specific device that allows stable intra-cellular measurement or operation to be easily performed.

The present invention has been made in view of the above-described problems, and an object of the present invention is to provide a cantilever for measuring intra-cellular and inter-cellular microspaces that allows stable intra-cellular measurement or operation to be easily performed, which is durable, reliable, and low cell-invasive.

Another object of the present invention is to provide a cantilever for measuring intra-cellular and inter-cellular microspaces that allows performing, easily and stably with good reproducibility and minimum variation, nano-cell mapping, i.e., measurement in intra-cellular and inter-cellular microspaces and introducing and taking a substance to and out of the microspaces.

BRIEF SUMMARY OF THE INVENTION

Briefly, a cantilever for measuring intra-cellular and inter-cellular microspaces according to the present invention includes: a support portion; a lever portion provided to the support portion so as to protrude therefrom; and a probe portion provided near a free end of the lever portion, wherein the probe portion includes a conductive probe made of a carbon-based material, and an insulating film to coat a periphery of the conductive probe.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

DETAILED DESCRIPTION OF PREFERRED EMBODIMENTS

Figure 1:
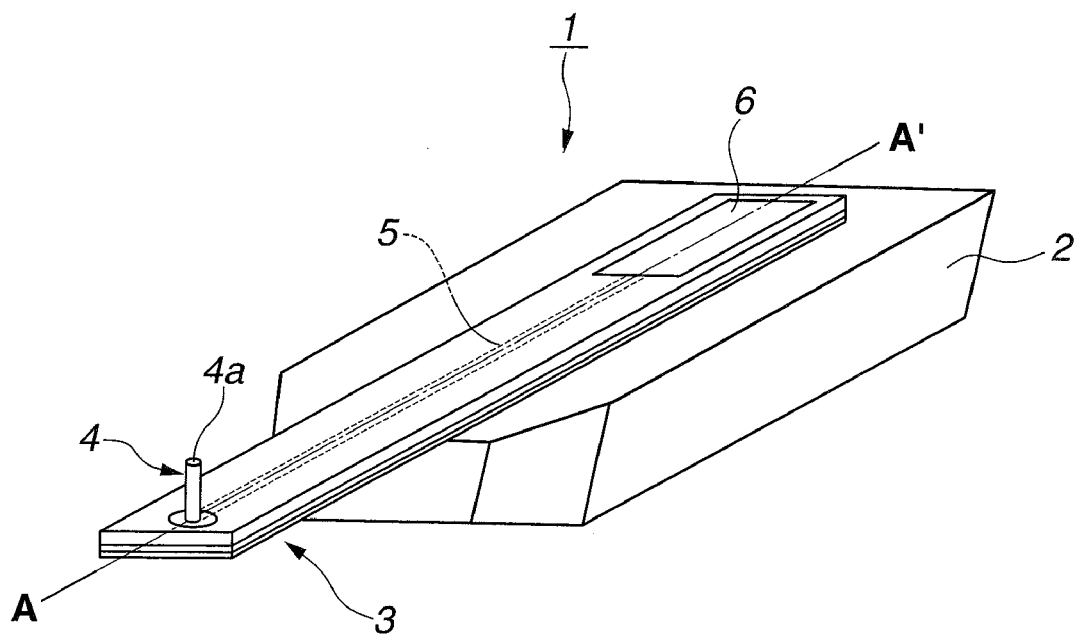
FIG. 1 is a perspective view showing an appearance configuration of a cantilever for measuring intra-cellular and inter-cellular microspaces according to a first embodiment of the present invention.

Preferred embodiments of the present invention are described below referring to the drawings.

First Embodiment

Figure 2:
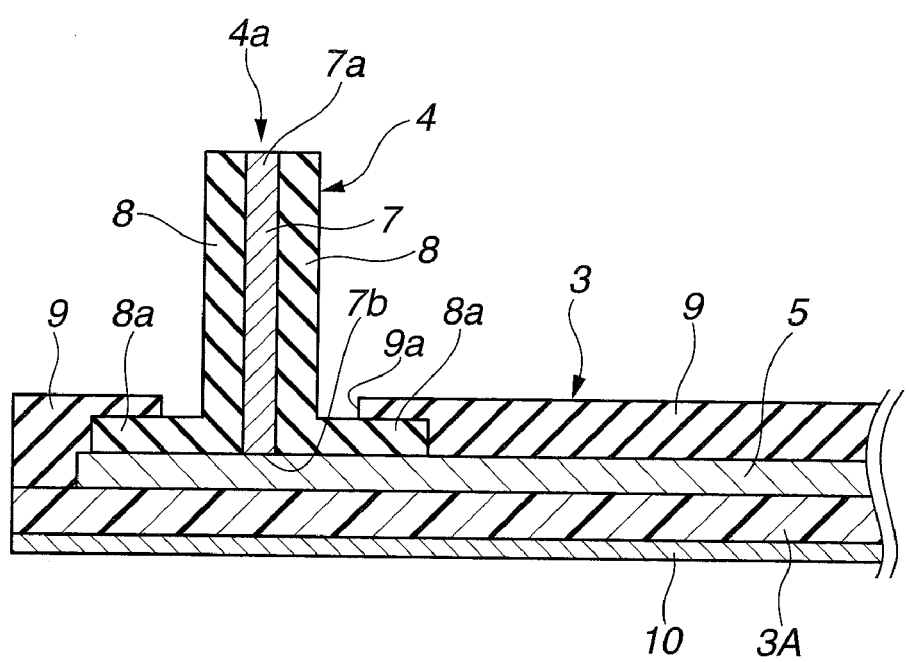
FIG. 2 is a partially cut sectional view of a lever portion along A-A' line of the cantilever for measuring intra-cellular and inter-cellular microspaces according to the first embodiment of the present invention of FIG. 1.
Figure 3:
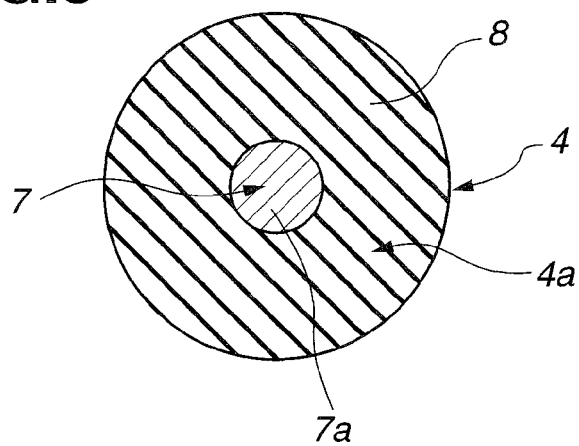
FIG. 3 is a sectional view of a probe portion according to the first embodiment, in a vertical direction with respect to a projecting direction.
Figure 4:
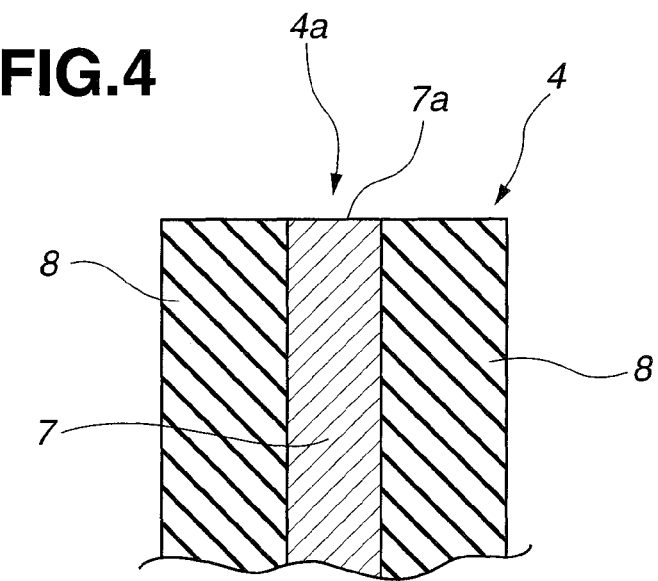
FIG. 4 is a sectional view of a distal end part in the projecting direction of the probe portion according to the first embodiment.
Figure 5:
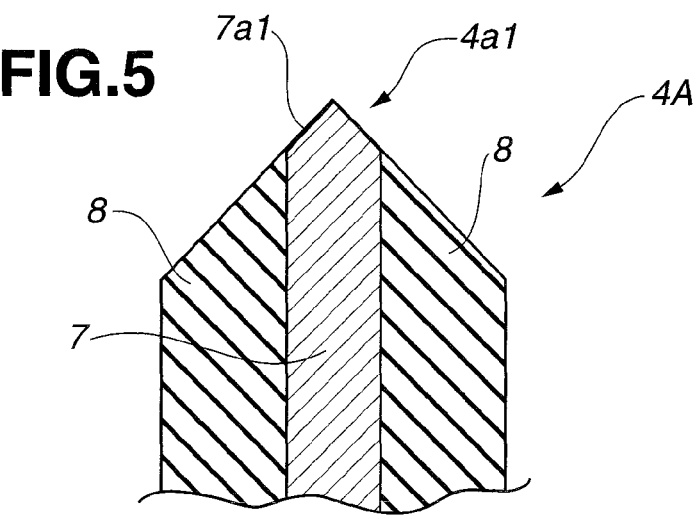
FIG. 5 is a sectional view of a distal end part showing a first modification example of the probe portion.
Figure 6:
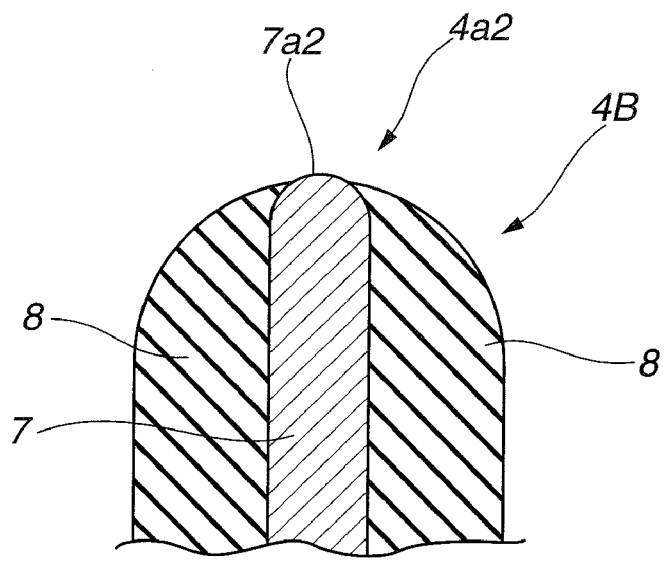
FIG. 6 is a sectional view of a distal end part showing a second modification example of the probe portion.
Figure 7:
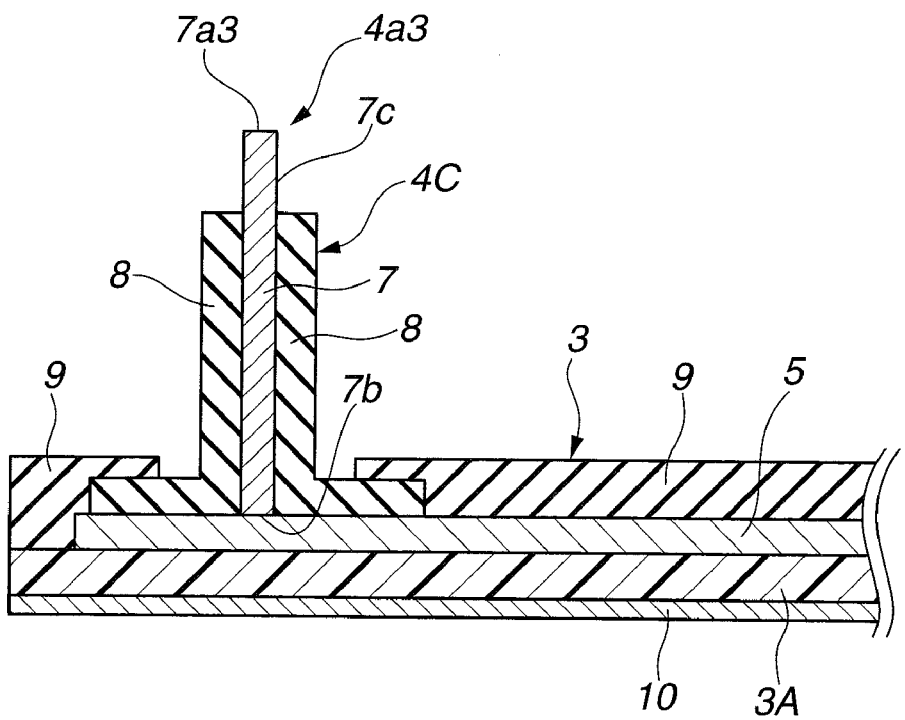
FIG. 7 is a partially cut sectional view of a probe portion and a lever portion, showing a third modification example of the probe portion.

FIGS. 1 to 7 relate to a first embodiment of a cantilever for measuring intra-cellular and inter-cellular microspaces of the present invention, wherein FIG. 1 is a perspective view showing an appearance configuration of the cantilever for measuring intra-cellular and inter-cellular microspaces according to the first embodiment; FIG. 2 is a partially cut sectional view of a lever portion along A-A' line of the cantilever for measuring intra-cellular and inter-cellular microspaces of FIG. 1; FIG. 3 is a sectional view of a probe portion according to FIG. 1, in a vertical direction with respect to a projecting direction; FIG. 4 is a sectional view of a distal end part in the projecting direction of the probe portion of FIG. 1; FIG. 5 is a sectional view of a distal end part showing a first modification example of the probe portion; FIG. 6 is a sectional view of a distal end part showing a second modification example of the probe portion; and FIG. 7 is a partially cut sectional view of a probe portion and a lever portion, showing a third modification example of the probe portion.

A cantilever for measuring intra-cellular and inter-cellular microspaces 1 (hereinafter referred to as cantilever 1) of the first embodiment, shown in FIG. 1, is used for measurement or operation in intra-cellular and inter-cellular microspaces.

Specifically, the cantilever 1 includes a support portion 2, a lever portion 3 protrudingly provided to the support portion 2, a probe portion 4 provided near a free end of the lever portion 3, an electrode pad 6 provided to a proximal end portion on the support portion 2 side of the lever portion 3, and a wiring portion 5 to electrically connect a conductive probe 7 to be described below of the probe portion 4 and the electrode pad 6 via inside of the lever portion 3.

The support portion 2 is held to a cantilever holder or the like in a cell operating device not shown when performing measurement or operation in intra-cellular and inter-cellular microspaces. Onto, for example, a bottom face portion of the support portion 2, a proximal end side part of the lever portion 3 is supportedly fixed. Note that the manner in which the lever portion 3 is mounted to the support portion 2 is not specifically limited, i.e., the mounting may be in any manner.

The lever portion 3 is configured of a material such as, for example, silicon oxide and a silicon nitride. Specifics of the configuration will be described later.

The probe portion 4 is formed near the free end of the lever portion 3. The probe portion 4 is provided so as to protrude in a vertical direction with respect to a longitudinal direction of the lever portion 3.

Note that, although the first embodiment describes a configuration in which the probe portion 4 is provided in the vertical direction with respect to the lever portion 3, no limitation is placed thereon. The probe portion 4 may be formed to be inclined toward any direction with respect to the lever portion 3.

Next, referring to FIGS. 2 to 7, there are described specific configurations of principal parts of the cantilever 1: the lever portion 3 and the probe portion 4.

In this embodiment, the probe portion 4 includes a conductive probe 7 which is a conductive member made of a carbon-based material, and an insulating film 8 provided to coat the periphery of the conductive probe 7, as shown in FIG. 2.

FIG. 3 shows a sectional configuration of the probe portion 4, in the vertical direction with respect to the projecting direction of the probe portion 4. In other words, in the first embodiment, the probe portion 4 is formed in, for example, a circular cylinder shape as shown in FIG. 3. The conductive probe 7 configuring the probe portion 4 is also formed in, for example, a circular cylinder shape.

Note that the shapes of the probe portion 4 and the conductive probe 7 are not limited to a circular cylinder shape, and may be formed otherwise, for example, in a columnar shape such as of elliptic cylinder or prism, or in a conic shape such as of cone or pyramid. Nevertheless, the probe portion 4 and the conductive probe 7 are preferably formed in a circular cylinder shape in order to reduce cell damage, as described above.

The insulating film 8 is provided to coat the periphery of the conductive probe 7 having such a shape. Accordingly, the shape of the insulating film 8 may be changed to change the shape of the probe portion 4 itself, while leaving as is the shape of the conductive probe 7. Note that, as long as the insulating film 8 can ensure insulation when completely coating the periphery of the conductive probe 7, the insulating film 8 is not specifically limited in shape, thickness and so on, and may be configured in any columnar or conic shape.

A distal end surface 4a of the probe portion 4 is formed in, for example, a planar shape, as shown in FIGS. 2 and 4. In the distal end surface 4a, a distal end surface 7a of the conductive probe 7 is provided. The distal end surface 7a is provided in a manner to be in a same plane as that of the distal end surface of probe portion 4. To a proximal end portion on a reverse side to the distal end surface 7a of conductive probe 7, a proximal end surface 7b is formed.

At a lower portion of the insulating film 8, there is provided an engaging portion 8a to engage with and be fixed to the lever portion 3.

Here, materials of the conductive probe 7 and the insulating film 8 configuring the probe portion 4 are described.

Specifically, the conductive probe 7 is configured of a carbon-based material, which is at least one of single crystal diamond, polycrystalline diamond, nanodiamond, diamond-like carbon, and amorphous carbon, for example. Such a carbon-based material is doped with boron, Lin, or the like, to configure the conductive probe 7.

Thus, the conductive probe 7, which is configured using such a carbon-based material, has a high rigidity to improve durability and an oxidation-resistant characteristic, and therefore is reliable. Accordingly, the probe portion 4 configured using the conductive probe 7, which is thus durable and reliable, allows an intra-cellular stable measurement or operation to be easily and stably performed.

The insulating film 8 is configured of one layer of any of an oxide film, nitride film, and organic film, or by a laminated film including at least one of an oxide film, nitride film, and organic film. Such a laminated film can be formed by a commonly available method. Therefore, the insulating film 8 can be easily formed to cover the conductive probe 7.

The insulating film 8 may be formed using, instead of the laminated film, a carbon-based material including at least one of polycrystalline diamond, nanodiamond, diamondlike carbon, and amorphous carbon. Nevertheless, it is to be noted that, in the first embodiment, it is preferable to use a carbon-based material to form the insulating film 8, in view of adaptability to living body and capability in surface treatment to improve adhesion of the substance to be introduced (surface treatment to form a surface-modified portion to be described below).

Thus, by covering the periphery of the conductive probe 7 with the insulating film 8, there is provided a configuration preferable to precisely measure electric potential in intra-cellular and inter-cellular microspaces, as described below. This configuration is also preferable to allow easily introducing the substance to be introduced to a desired position in the intra-cellular and inter-cellular microspaces and taking a substance out from a desired position.

Note that it is preferable to form the probe portion 4 such that a distal end portion thereof has a diameter not greater than 1 μm, preferably not greater than 400 nm. It is further preferable to form the probe portion 4 to have a length not less than 2 μm, preferably not less than 5 μm, and more preferably not less than 10 μm.

The conductive probe 7 of the probe portion 4 having such a configuration is electrically connected to the wiring portion 5 through contact of the proximal end surface 7b with the wiring portion 5 in the lever portion 3, as shown in FIG. 2.

Here, configuration of the lever portion 3 is described. As shown in FIG. 2, the lever portion 3 engages with the engaging portion 8a of the insulating film 8 of the probe portion 4 to fix the probe portion 4 itself. Further, the lever portion 3 includes a protection film 9 to protect the wiring portion 5 in the lever portion, the wiring portion 5 arranged next to the protection film 9, a lever main body portion 3A to sandwichingly hold the wiring portion 5 with the protection film 9, and an optical reflection film 10 which is coating treated on an outer surface of the lever main body portion 3A.

The protection film 9 is configured of an insulative member and provided to cover the entire surface on one side of the lever portion 3 except the part corresponding to the electrode pad 6. Though not illustrated, the protection film 9 is also provided over the entire surface of the support portion 2 on a side oriented in the same direction as the one side of the lever portion 3.

In the vicinity of the probe portion 4 on the protection film 9, an aperture 9a is formed to expose the engaging portion 8a of the insulating film 8. Note that, although the first embodiment describes a configuration in which the aperture 9a is provided in the vicinity of the probe portion 4 on the protection film 9, no limitation is placed thereon. The protection film 9 may be formed to entirely cover the circumference of the insulating film 8 of the probe portion 4 without providing the aperture 9a. This permits firmly fixing the probe portion 4 to the lever portion 3.

Though not illustrated, the protection film 9 has an aperture at a part corresponding to the electrode pad 6 above the support portion 2, for electric connection between the internal wiring portion 5 and the electrode pad 6.

Note that, although the first embodiment describes a configuration in which the protection film 9 is provided, no limitation is placed thereon, i.e., there may be a configuration without the protection film 9 if so needed.

The wiring portion 5 is electrically connected to the conductive probe 7 through contact with the proximal end surface 7b of the conductive probe 7. A proximal end portion of the wiring portion 5 on the support portion 2 side is electrically connected to the electrode pad 6 for electrical connection to an external device such as an electrometer, for example.

Note that a preferable material for the wiring portion 5 is platinum or iridium, which facilitates accumulation and growth of the conductive probe 7 of a carbon-based material. Yet, as long as adhesion with the conductive probe 7 can be assured, the wiring portion 5 may be configured of a material of a metal other than platinum or iridium. The wiring portion 5 may also be otherwise configured using a semiconductor material such as polysilicon.

In addition, a conductive material such as titanium or chrome may be formed between the wiring portion 5 and the lever main body portion 3A to improve adhesion therebetween. Likewise, a conductive material such as titanium or chrome may be formed between the wiring portion 5 and the protection film 9 to improve adhesion therebetween.

Although the electrode pad 6 may be formed with the wiring portion 5 itself, an electrode layer such as of gold, copper or aluminum may be formed on the pad to facilitate electric connection with an external terminal through solder connection, wire bonding, or the like. In this case, a conductive material such as titanium, chrome or the like may be formed between the electrode pad 6 and the electrode layer in order to improve adhesion between the electrode pad 6 and the electrode layer.

The optical reflection film 10 provided on the outer surface of the lever main body portion 3A is formed by being subjected to coating treatment with aluminum or gold. Note that the optical reflection film 10 may be configured not only limitedly by such a coating treatment but using another method. The optical reflection film 10 may also be configured provided with a multilayer film.

In a system configuration comprised, for example, of the cantilever 1 and external devices such as an external optical system apparatus and a personal computer, the optical reflection film 10 serves to detect reflection angle or reflection amount of lights irradiated from the external optical system apparatus. In such a system, the personal computer analyzes a detection result by the optical reflection film 10 to enable dynamically detecting whether or not the probe portion 4 is in contact with a cell membrane, which is effective for performing measurement or operation in the intra-cellular and inter-cellular microspaces.

Thus, with the above-described configuration, the cantilever 1 can be low cell-invasive, allowing various measurements or operations in the intra-cellular and inter-cellular microspaces to be performed easily and stably with good reproducibility and minimum variation.

In addition, since the protection film 9 covers the entire surface on one side of the lever portion 3 except the part corresponding to the electrode pad 6 above the support portion 2, it is possible to easily perform stable measurement and operation in the intra-cellular and inter-cellular microspaces, in various environments such as one in which the cell is soaked in a water-system solution such as cultured liquid or isotonic sodium chloride solution.

Moreover, the use of the durable and reliable conductive probe 7 to configure the probe portion 4 can make the cantilever 1 to be highly durable and highly reliable.

Note that, in the first embodiment, the probe portion 4 may be configured such that the distal end surface 4a configures a distal end portion 4a1 in a shape with a distal end portion 7a1 of the conductive probe 7 protruding from the insulating film 8, as shown with a probe portion 4A in a first modification example of FIG. 5, instead of providing the distal end surface 7a of the conductive probe 7 in the same plane as that of the insulating film 8.

In this case, the distal end portion 4a1 of the probe portion 4A and the distal end portion 7a1 of the conductive probe 7 are configured in a cone shape such as, for example, a circular cone or pyramid.

The probe portion 4 may also be configured such that, in the case where, as shown by a probe portion 4B in a second modification example of FIG. 6, a distal end portion 4a2 is configured in a shape such that a distal end portion 7a2 of the conductive probe 7 protrudes from the insulating film 8, the distal end portion 7a2 of the conductive probe 7 is formed in an arc shape such as a hemispheric or ellipse sphere shape, while also forming a distal end portion of the insulating film 8 in the periphery of the distal end portion 7a2 in an arc shape such as hemispheric or ellipse sphere shape. In other words, forming the distal end portion 4a2 of the probe portion 4B in arc shape leads to an effect of allowing reducing cell damage.

Furthermore, the probe portion 4 may be configured such that, in the case where, like the probe portion 4C shown in the third modification example of FIG. 7, the distal end portion 4a3 is configured in a shape such that the distal end surface 7a3 of the conductive probe 7 protrudes from the insulating film 8, a protruding portion 7c of the conductive probe 7 is provided, and the distal end surface 7a3 of the protruding portion 7c and the distal end surface of the insulating film 8 are provided at different positions, not in a same plane. In other words, the provision of the protruding portion 7c of the conductive probe 7 increases the exposing surface area of the conductive probe 7, which is effective to improve the adhesion capability of the substance to be introduced and the intra-cellular substance.

Figure 8:
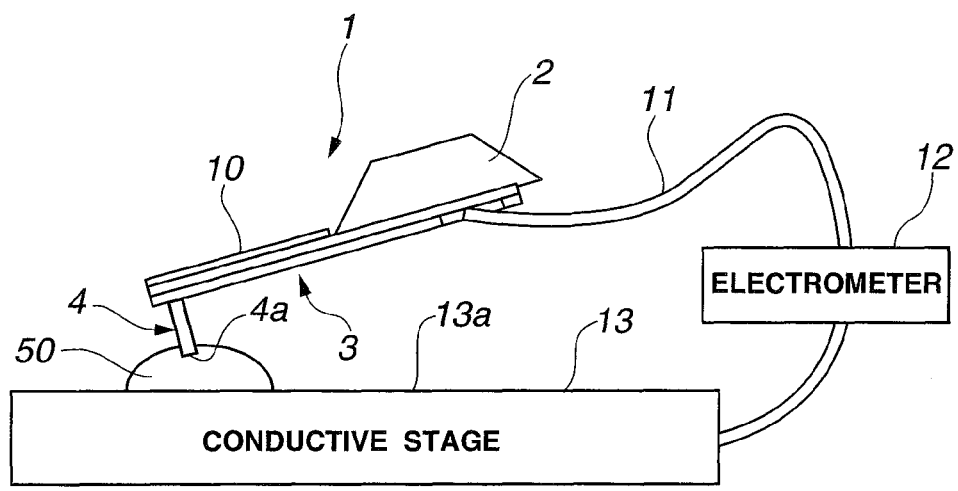
FIG. 8 is a pattern view showing a schematic configuration of an entire system having the cantilever of the first embodiment of the present invention.
Figure 9:
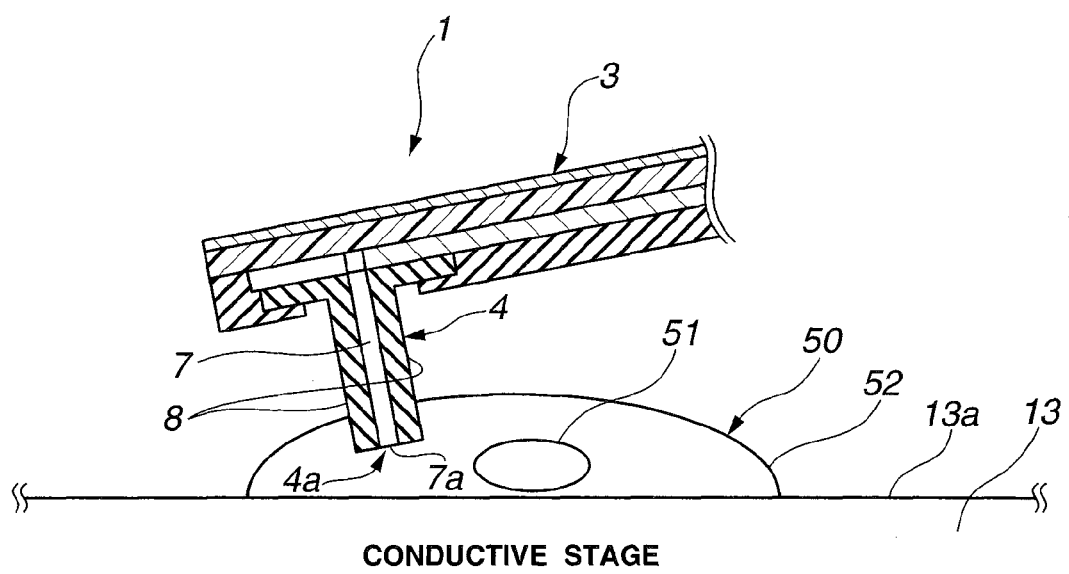
FIG. 9 is an enlarged view of the probe portion of the cantilever and inside of a cell in measuring intra-cellular electric potential difference in the first embodiment.

Next, referring to FIGS. 8 and 9, there are described configuration example and action in a system configuration to actually measure an electric potential difference of intra-cellular and inter-cellular microspaces using the cantilever 1 having the above configuration.

FIG. 8 is a pattern view showing a schematic configuration of an entire system having the cantilever 1 of the first embodiment of the present invention. FIG. 9 is an enlarged view of the probe portion 4 of the cantilever 1 and the inside of the cell in measuring intra-cellular electric potential difference.

As shown in FIG. 8, the system includes: a cantilever 1 shown in FIG. 1; a connection line 11, which is electrically connected to the electrode pad 6 of the cantilever 1; an electrometer 12 which is electrically connected to the connection line 11 and can measure an electric potential difference between a distal end portion of the probe portion 4 of the cantilever 1 and a conductive stage to be described below; and a conductive stage 13 which is electrically connected to the connection line 11 from the electrometer 12 and configured of a conductive member having a placement surface 13a on which a cell 50 is placed.

With such a configuration, the cantilever 1 and the conductive stage 13 are electrically connected via the connection line 11 and the electrometer 12. Note that, for the sake of simplicity, descriptions will be omitted of the cantilever holder for holding the support portion 2 of the cantilever 1 and other external devices such as a personal computer: configuration and action of only principal parts are described.

It is now supposed that an operator measures an intra-cellular electric potential difference using the system configured as shown in FIG. 8. In this case, the operator places the cell 50 on the placement surface 13a of the conductive stage 13.

With the power of the system turned on, the operator moves the probe portion 4 of the cantilever 1 toward the cell 50 as shown in FIG. 9. Note that the cell 50 has an intracellular nucleus 51 and a cell membrane 52 as is well-known.

Then, the distal end surface 4a of the probe portion 4 of cantilever 1 contacts the cell membrane 52 of the cell 50.

In the first embodiment, the contact of the probe portion 4 of the cantilever 1 with the cell membrane 52 may be detected either electrically by the electrometer 12 or dynamically by means of a reflected light from the optical reflection film 10, or the like, as described above.

Thereafter, the operator inserts the probe portion 4 of the cantilever 1 into the cell 50, penetrating the cell membrane 52, as shown in FIG. 9.

Next, the operator measures an electric potential difference between the distal end surface 4a of the probe portion 4 in the cell 50 and the conductive stage 13, using the electrometer 12. Measurement result at this time is recorded by a personal computer not shown.

In the first embodiment, the operator here re-stabs the probe portion 4 into the cell 50 in the method mentioned above, measuring an electric potential difference for each re-stabbing of the probe portion. This allows obtaining a measurement result of electric potential distribution at a desired position in the cell 50.

For example, the number of times of the re-stabbing preferably ranges from about dozens of times to 100 times, but no limitation is placed thereon, i.e., the re-stabbing may be performed by a number of times as needed. Even if the probe portion 4 is re-stabbed by dozens of times, the cell 50 will not die. The position of the re-stabbing into the cell 50 may be set as desired as needed.

With the use of the above-mentioned system, by thus re-stabbing the probe portion 4 into the cell 50 several times to measure respective electric potential differences, it is enabled to measure a minute electric potential distribution in a desired position in the cell 50, and therefore to perform nano-cell mapping by the electric potential distribution.

Note that the nano-cell mapping maps a physical parameter such as of intra-cellular and inter-cellular substances, electric potentials or the like present in an organization/trachea, or maps subtle distribution of strength and weakness of a specific biological function, and is not limited to use for the electric potential distribution.

Also, since the probe portion 4 and the lever portion 3 are covered by the insulating film 8 and the protection film 9, respectively, it is possible to measure the electric potential difference and the electric potential distribution even if the cell 50 is soaked in a water system solution such as culture media or isotonic sodium chloride solution.

Thus, according to the first embodiment, it is enabled to easily and stably measure an electric potential difference between the inside of the cell and the cell membrane, as well as to easily and stably measure, in real-time, intra-cellular or inter-cellular electric potential distribution. It is therefore rendered possible to realize a cantilever (the cantilever 1) for measuring intra-cellular and inter-cellular microspaces, which is durable, reliable, and low cell-invasive, enabling stable intra-cellular measurement or operation to be easily performed.

Furthermore, by using a system including the cantilever 1 to measure an intra-cellular electric potential distribution, it is made possible to perform nano-cell mapping of intra-cellular and inter-cellular electric potential.

Second Embodiment

FIGS. 10 to 17 relate to a second embodiment of the cantilever for measuring intra-cellular and inter-cellularmicrospaces of the present invention. FIGS. 10 to 13 are illustrative views to describe a method to introduce into the cell the substance to be introduced using a system including the cantilever. FIGS. 14 to 17 are illustrative views to describe a method to take the intra-cellular substance out of the cell using a system including the cantilever.

Note that, in FIGS. 10 to 17, components same as the cantilever 1 and those of the system of the first embodiment are attached with the same symbols, omitting descriptions thereof: only different parts are described.

In the case of the cantilever 1 of the second embodiment, which is configured in generally the same manner as the cantilever 1 of the first embodiment, at least distal end part of the conductive probe 7 has a surface-modified portion 40 subjected to a surface treatment to facilitate adhesion of the intra-cellular substance and the substance to be introduced into the cell.

The surface-modified portion 40 is to be formed by being subjected to a surface treatment using any one of hydrogen, oxygen, fluorine, amino acid, silane, organic molecules, or biological molecules.

Note that the surface-modified portion 40 may be formed on at least one of, for example, the distal end surface 7a or an exposed portion of the conductive probe 7 and the distal end surface or an exposed portion of the insulating film 8 forming the distal end surface 4a.

Formation of the surface-modified portion 40 is not limited to on the distal end portion of the probe portion 4, but may be on a range from the distal end portion to circumference of the probe portion 4, subjected to a surface treatment using the above-mentioned material.

Further, the method to form the surface-modified portion 40 is not limited to surface treatment, but any method including physical combination may be used to form the surface-modified portion.

Furthermore, the surface-modified portion 40 is not necessarily a requirement, but as described below, it is effective to form the surface-modified portion 40 to introduce the substance to be introduced into the intra-cellular and inter-cellular microspaces or taking the intra-cellular substance out of the cell.

Therefore, with the cantilever 1 thus configured, which includes the surface-modified portion 40 subjected to a surface treatment near the distal end portion of the probe portion 4, it is facilitated to adhere a substance to be introduced 53 described below to the distal end portion of the probe portion 4, and to adhere an intra-cellular substance 54 in the intra-cellular and inter-cellular microspaces to the distal end portion of the probe portion 4 when taking the intra-cellular substance 54 out of the intra-cellular and inter-cellular microspaces.

Figure 10:
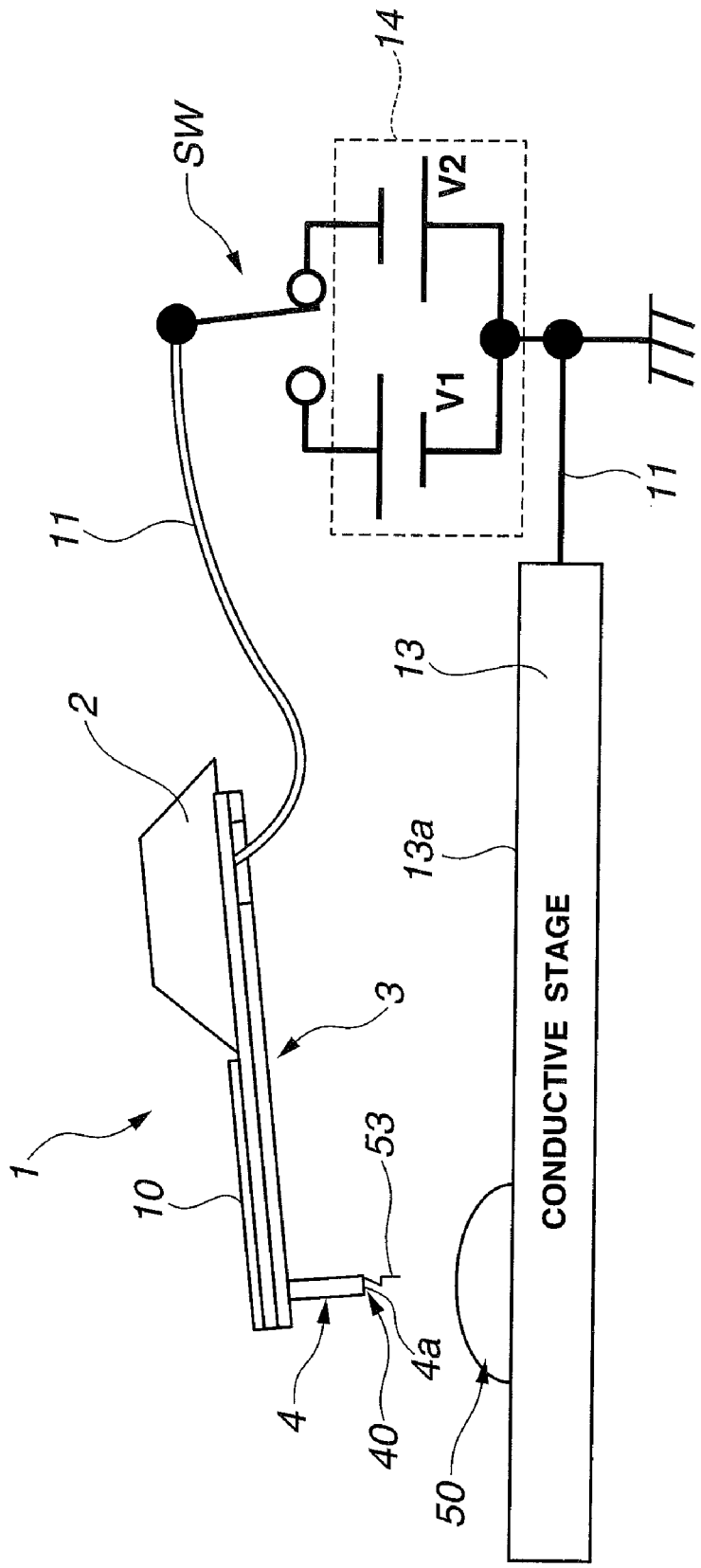
FIG. 10 is an illustrative view showing a state where a probe portion of a cantilever for measuring intra-cellular and inter-cellular micro spaces according to a second embodiment of the present invention is applied with an electronegative potential to adsorb a substance to be introduced to the probe portion.

FIG. 10 shows a system configured using the cantilever 1 as mentioned above, for introducing the substance to be introduced into the cell or taking the intra-cellular substance out of the cell.

As shown in FIG. 10, this system includes the cantilever 1 including the surface-modified portion 40, a power supply portion 14 including a first power supply V1 and a second power supply V2, replacing the electrometer 12 of the first embodiment, and a switch SW for changing over between the first power supply V1 and the second power supply V2. In this system, the conductive stage 13 is connected so as to be ground potential.

Positive pole side of the first power supply V1 of the power supply portion 14 is connected with one terminal of the switch SW, and negative pole side thereof with the connection line 11 from the conductive stage 13.

Negative pole side of the second power supply V2 of the power supply portion 14 is connected with the other terminal of the switch SW, and positive pole side thereof with the connection line 11 from the conductive stage 13.

The switch SW is connected with the connection line 11 from the electrode pad 6 of the cantilever 1. When the switch SW is changed over to the one terminal on the first power supply V1 side of the power supply portion 14, the electric potential of the positive pole is applied to the cantilever 1 side. On the other hand, when the switch SW is changed over to the other terminal on the second power supply V2 side of the power supply portion 14, an electric potential of the negative pole, having reversed polarity, is applied to the cantilever 1 side.

Note that the switch SW can be turned off to change over the cantilever 1 to a floating state where no electric potential is applied thereto from the first power supply V1 or the second power supply V2.

Next, there are described a method to introduce the substance to be introduced into the cell, and a method to take the intra-cellular substance out of the cell, using a system including the cantilever 1 configured as mentioned above.

First, the method to introduce into the cell the substance to be introduced is described referring to FIGS. 10 to 14.

Figure 11:
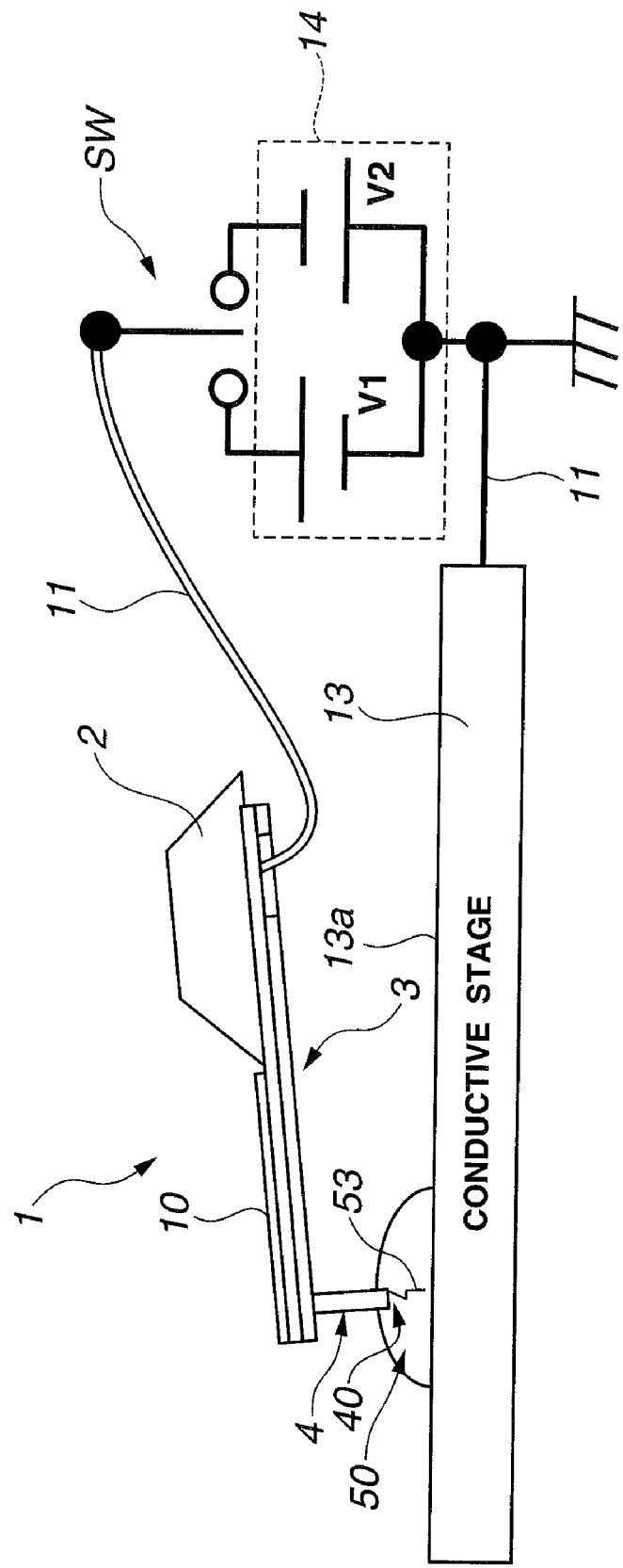
FIG. 11 is an illustrative view showing a state where the probe portion, which is in an electrically floating state, is being inserted into the cell in the second embodiment.
Figure 12:
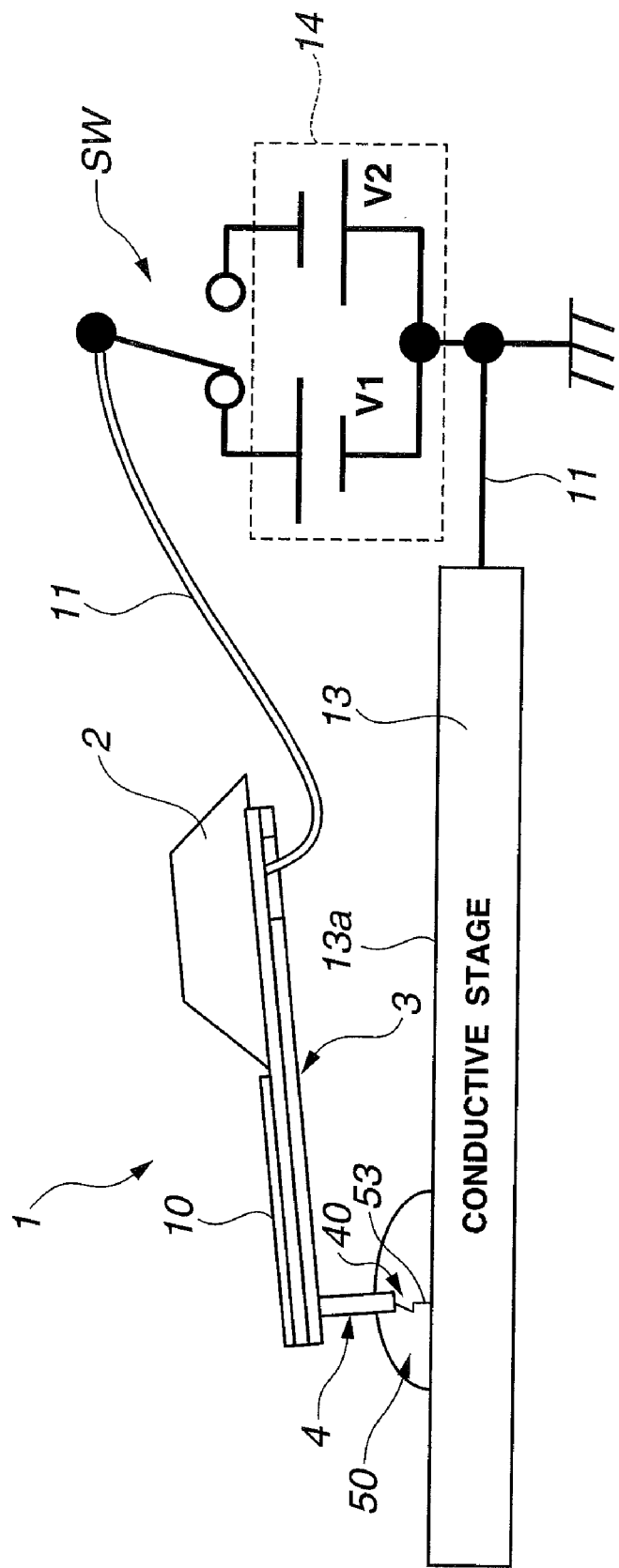
FIG. 12 is an illustrative view showing a state where an electropositive potential is applied to the probe portion of the cantilever to separate in the cell the substance to be introduced from the probe portion in the second embodiment.
Figure 13:
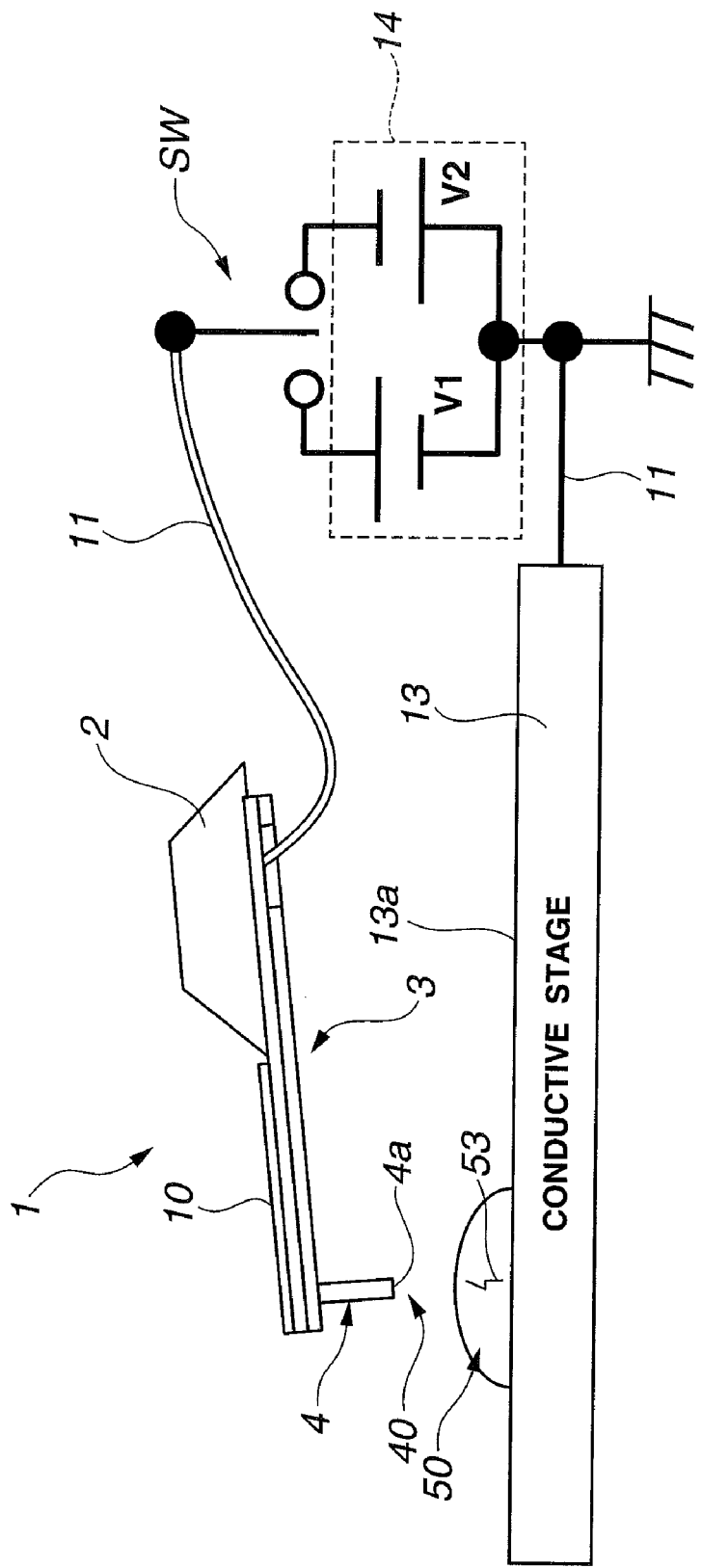
FIG. 13 is an illustrative view showing a state where, with the probe portion in the electrically floating state, only the probe portion is pulled out of the cell in the second embodiment.

Note that FIG. 10 shows a state where an electronegative potential is applied to the probe portion 4 of the cantilever 1 to adsorb to the probe portion the substance to be introduced 53; FIG. 11 shows a state where the probe portion 4, placed in an electrically floating state, is being inserted into the cell 50; FIG. 12 shows state where the electropositive potential is applied to the probe portion 4 of the cantilever 1 to separate the substance to be introduced 53 in the cell 50; and FIG. 13 shows a state where, only the probe portion 4, placed in the electrically floating state, is pulled out of the cell 50.

It is supposed that an operator now introduces the substance to be introduced 53 into the cell 50 using the system configured as shown in FIG. 10. In this case, the operator places in advance the cell 50 on the placement surface 13a of the conductive stage 13.

Then, with the power supply of the system turned on, the operator operates to change over the switch SW to the other terminal on the second power supply V2 side, as shown in FIG. 10.

This results in the probe portion 4 of the cantilever 1 to be applied with a negative potential from the second power supply V2. This allows electrically promoting the adsorption of the substance to be introduced 53 which is positively charged, such as a gene or protein, to the vicinity of the distal end portion of the probe portion 4.

Thereafter, the operator operates the switch SW to switch off the power supply portion 14, as shown in FIG. 11, so as to place the probe portion 4 of the cantilever 1 in the electrically floating state. Then, while retaining this state, the operator moves the cantilever 1 toward the cell 50 and inserts the former into the latter.

Next, after confirming that the probe portion 4 of the cantilever 1 has reached the desired position in the cell, the operator operates to change over the switch SW to the one terminal on the first power supply V1 side, as shown in FIG. 12.

This results in the probe portion 4 of the cantilever 1 to be applied with the electropositive potential from the first power supply V2. In other words, by changing over the polarity of the electric potential to be applied to the probe portion 4 so that the electropositive potential is applied thereto, it is enabled to promote separation of the substance to be introduced 53 adhering to the distal end portion of the probe portion 4 in the intra- and inter-cell 50 microspaces.

Thereafter, the operator operates the switch SW to switch off the power supply portion 14 so as to place the probe portion 4 of the cantilever 1 in the electrically floating state, as shown in FIG. 13. Then, while retaining this state, the operator pulls the cantilever 1 out of the cell 50, so as to leave the substance to be introduced 53, such as a gene or protein, in the intra- and inter-cell 50 microspace.

Next, a method to take the intra-cellular substance out of the cell is described referring to FIGS. 14 to 17.

Figure 14:
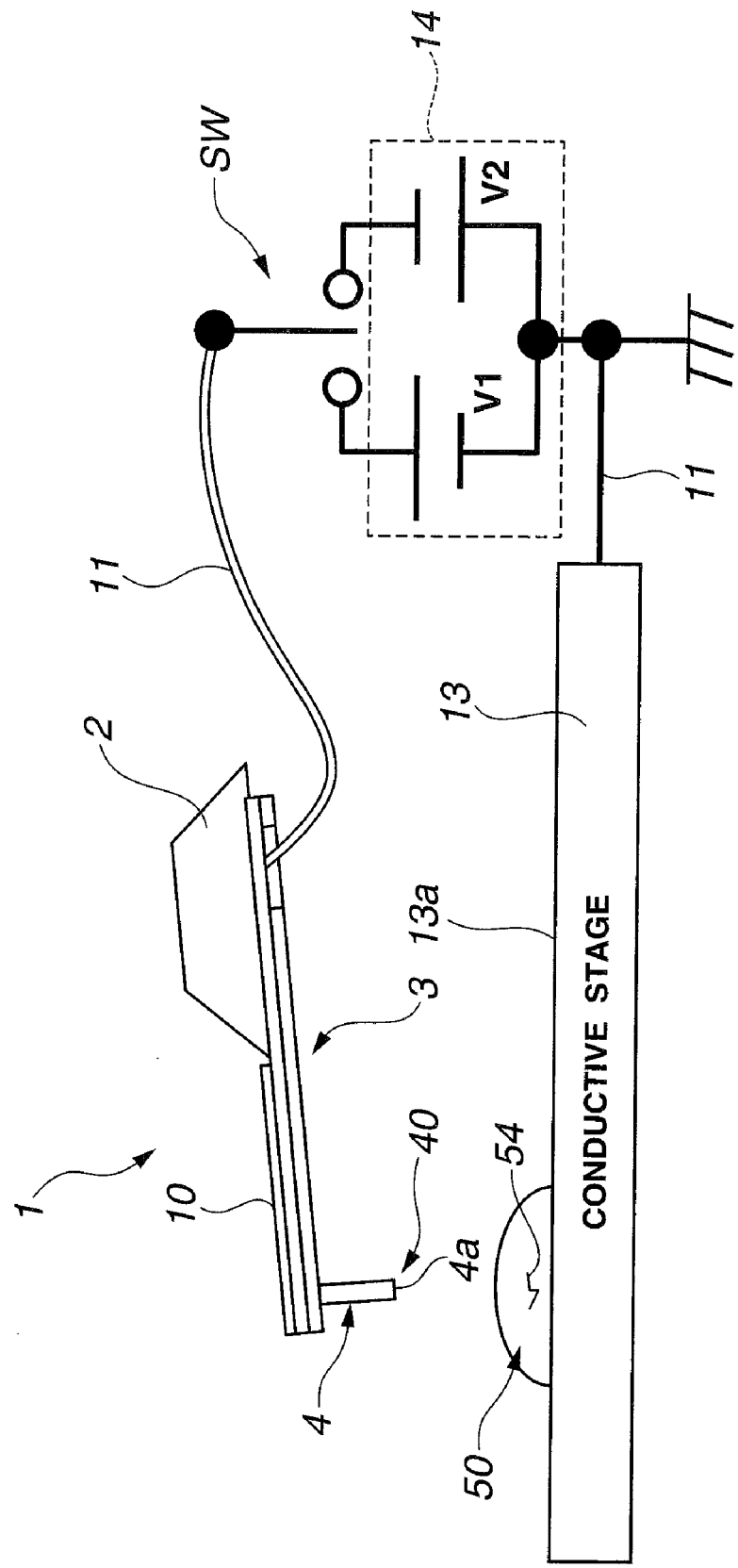
FIG. 14 is an illustrative view showing a state before the probe portion of the cantilever in the electrically floating state is inserted into the cell in the second embodiment.
Figure 15:
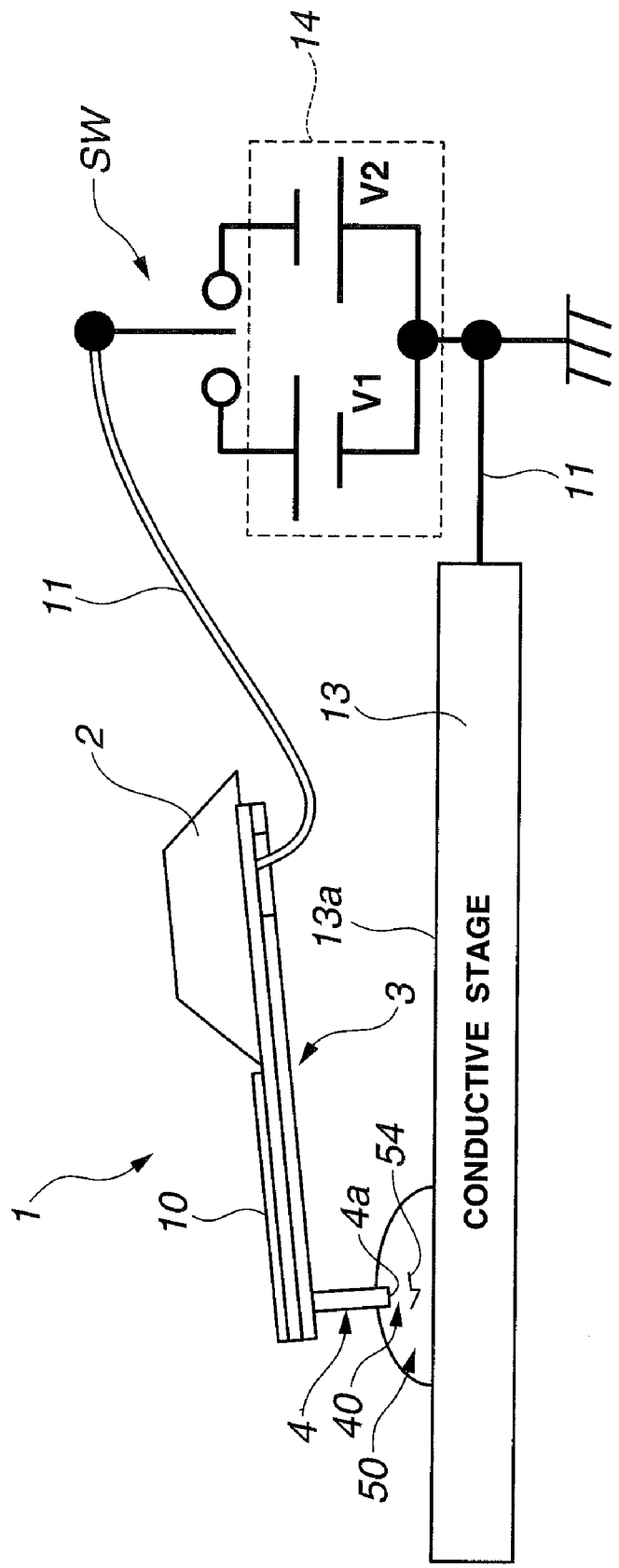
FIG. 15 is an illustrative view showing a state where the probe portion in the electrically floating state is inserted into the cell in the second embodiment.
Figure 16:
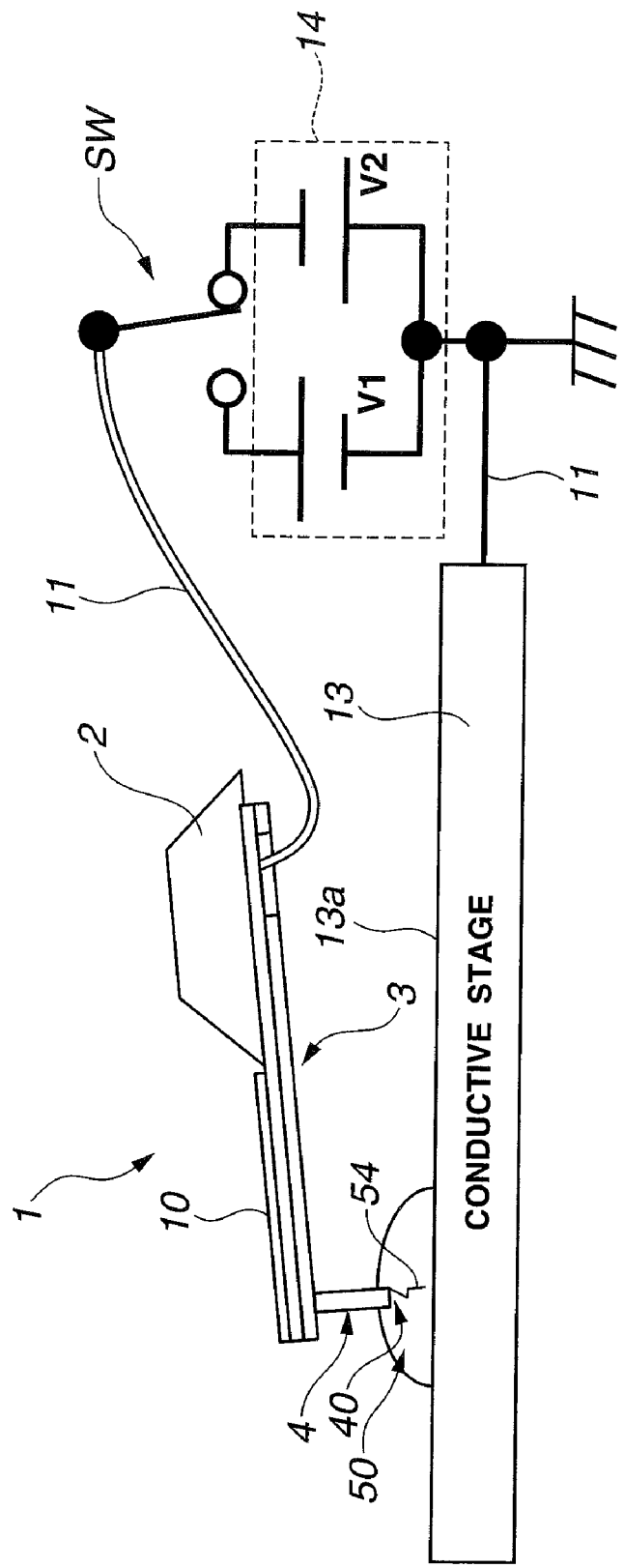
FIG. 16 is an illustrative view showing a state where the electronegative potential is applied to the probe portion of the cantilever to adsorb an intra-cellular substance in the cell to the probe portion in the second embodiment.
Figure 17:
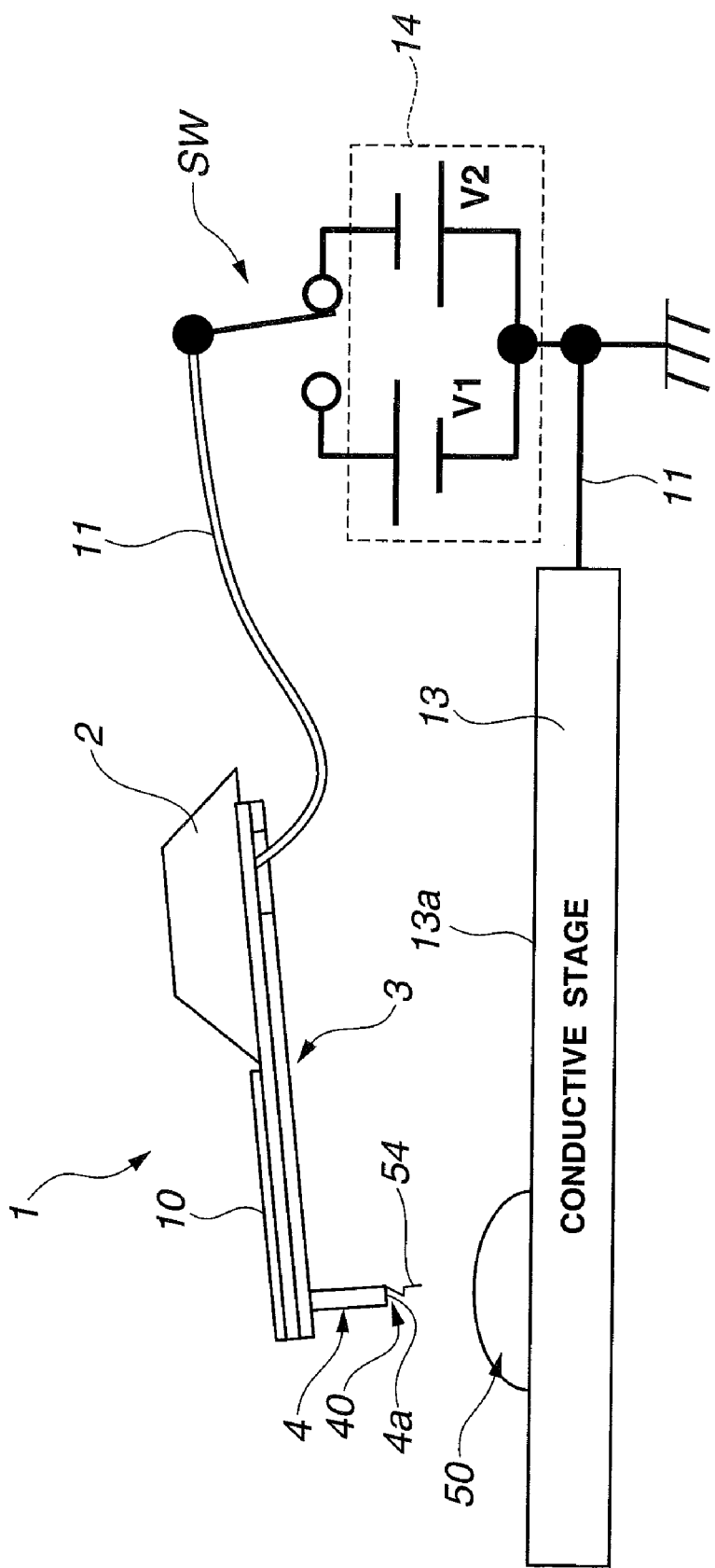
FIG. 17 is an illustrative view showing a state where, with the electronegative potential remained applied to the probe portion, the probe portion is pulled out of the cell along with the intra-cellular substance adsorbed to the probe portion in the second embodiment.

FIG. 14 shows a state before the probe portion 4 of the cantilever 1, which is remained in the electrically floating state, is inserted into the cell 50. FIG. 15 shows a state where the probe portion 4, which is remained in the electrically floating state, is inserted into the cell 50. FIG. 16 shows a state where the electronegative potential is applied to the probe portion 4 of the cantilever 1 to adsorb the intra-cellular substance 54 in the cell 50 to the probe portion 4. FIG. 17 shows a state where, with the electronegative potential remained applied to the probe portion 4, the probe portion 4 is pulled out of the cell along with the intra-cellular substance 54 adsorbed to the probe portion.

It supposed that the operator now takes the intra-cellular substance 54 out of the cell 50 using a system configured as shown in FIG. 14. Note that the cell 50 including the intra-cellular substance 54 inside thereof is placed in advance on the placement surface 13a of the conductive stage 13.

Then, with the power supply of the system turned on, the operator operates the switch SW to switch off the power supply portion 14 so as to place the probe portion 4 of the cantilever 1 in the electrically floating state as shown in FIG. 14.

While retaining this floating state, the operator moves the cantilever 1 toward the cell 50 to insert the former into the latter, as shown in FIG. 15.

Next, after confirming that the probe portion 4 of the cantilever 1 has reached a desired position in the cell 50, specifically, a position preferable to take out the intra-cellular substance 54, the operator operates to change over the switch SW to the other terminal on the second power supply V2 side, as shown in FIG. 16.

As a result, the probe portion 4 of the cantilever 1 is applied with the negative potential from the second power supply V2. This allows electrically promoting adsorption of the substance to be introduced 53 which is positively charged, such as a gene or protein, to the vicinity of the distal end portion of the probe portion 4.

Thereafter, after confirming that the intra-cellular substance 54 is adsorbed to the probe portion 4, the operator operates to pull the cantilever 1 out of the cell 50 while leaving the probe portion 4 of the cantilever 1 applied with the electronegative potential, as shown in FIG. 17. This can facilitate taking the intra-cellular substance 54 such as a gene or protein out of the cell 50.

Note that, to separate the taken out intra-cellular substance 54 from the probe portion 4, the operator only needs to operate the switch SW to switch off the power supply portion 14 so as to place the probe portion 4 of the cantilever 1 in the electrically floating state.

By the afore-mentioned method, it is made possible to easily and stably introduce and take a gene, protein or the like into and out of the intra-cellular and inter-cellular micro spaces.

Note that, in the second embodiment, the probe portion 4 of the cantilever 1 may be applied with an electric potential that is reverse to that described above in the second embodiment.

Furthermore, although the probe portion 4 was described to be placed in the electrically floating state when inserting or pulling the probe portion 4 of the cantilever 1 into or out of the intra-cellular and inter-cellular microspaces, the insertion or pulling out may be performed while applying an electric potential to the probe portion 4.

Thus, according to the second embodiment, it is possible not only to obtain the same effect as in the first embodiment, but also to introduce the substance to be introduced 53 and taking the intra-cellular substance 54 into and out of the intra- and inter-cell 50 microspaces in an easy manner by controlling electric polarities and electric potentials of the conductive stage 13 on which the cell 50 is placed and the cantilever 1.

Also, in this case, by forming the surface-modified portion 40 in the vicinity of the distal end portion of the probe portion 4 of the cantilever 1, it becomes possible to surely introduce the target substance to be introduced 53 into the intra- and inter-cell 50 microspaces, as well as to selectively and surely take out the target intra-cellular substance 54 in the intra- and inter-cell 50 microspaces.

Third Embodiment

Figure 18:
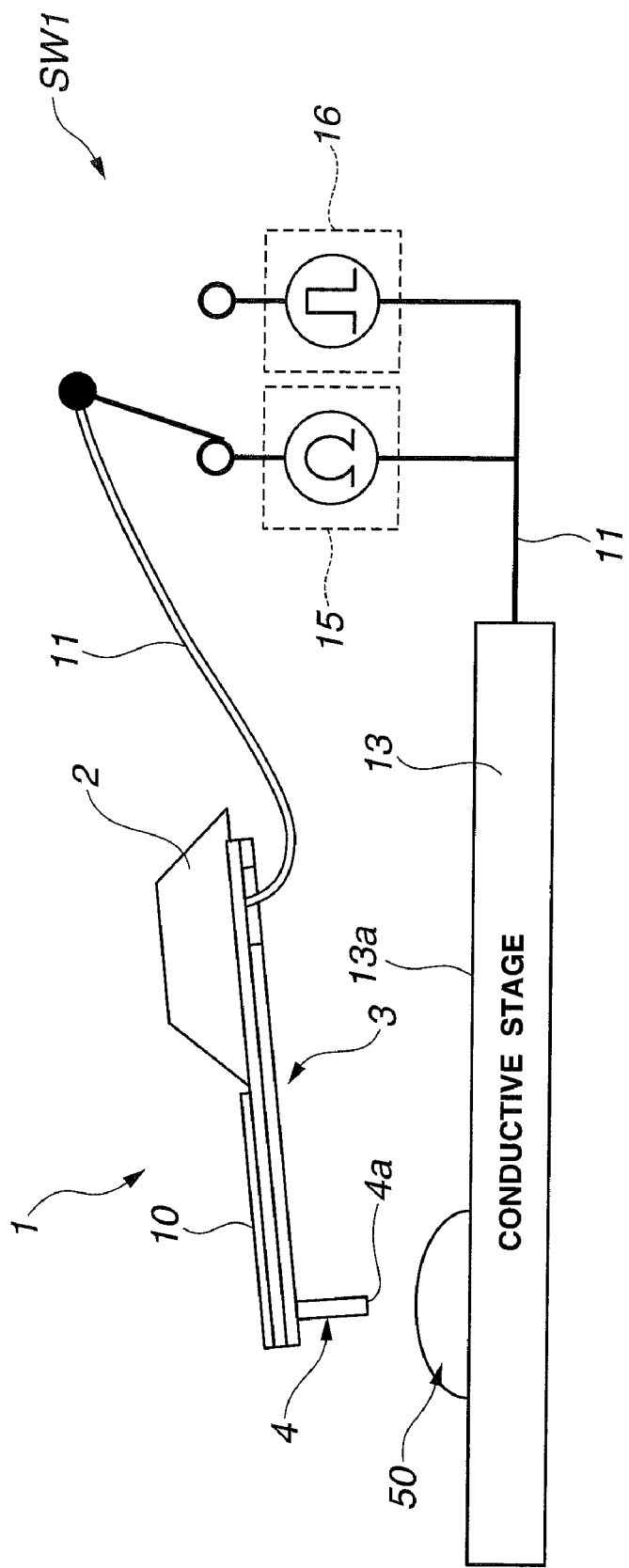
FIG. 18 is an illustrative view showing a state where a resistance meter is switched on to measure resistance between a conductive stage and the probe portion so as to detect contact between the probe portion and a cell membrane, according to a third embodiment of the present invention.
Figure 19:
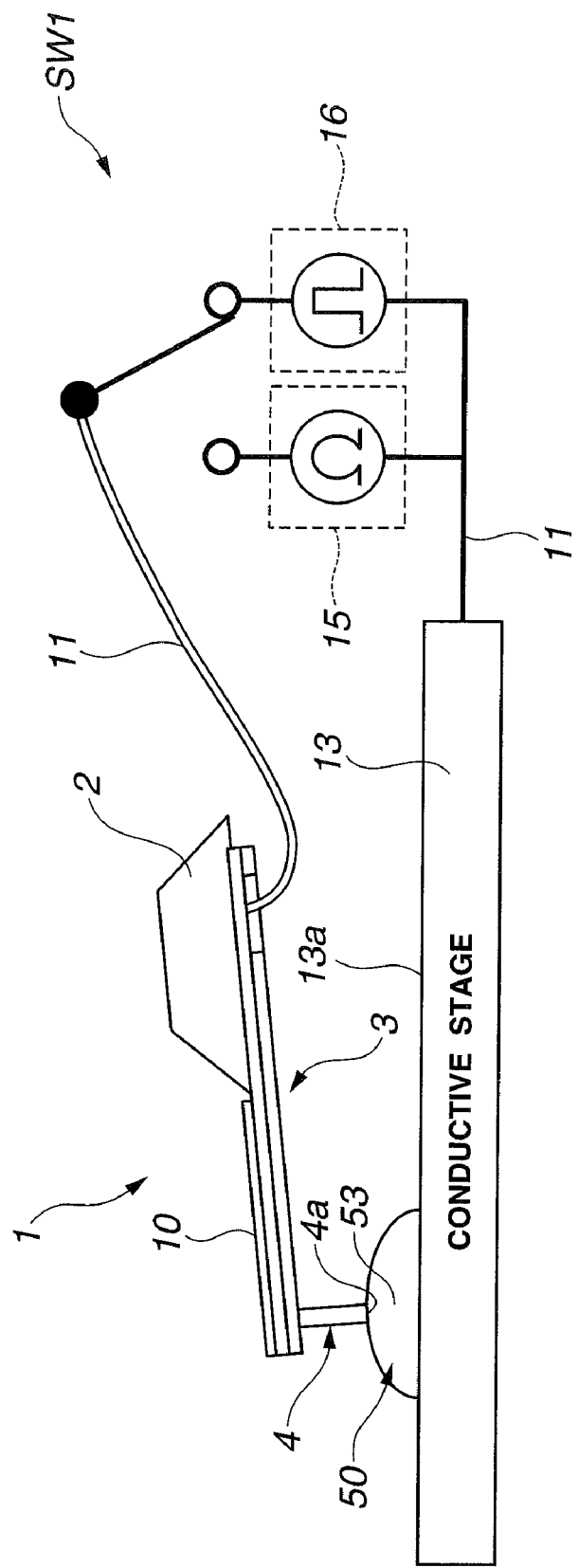
FIG. 19 is an illustrative view showing a state where a pulse generating unit is switched on to apply a pulse wave electric potential when contact between the probe portion and the cell membrane is detected in the third embodiment.
Figure 20:
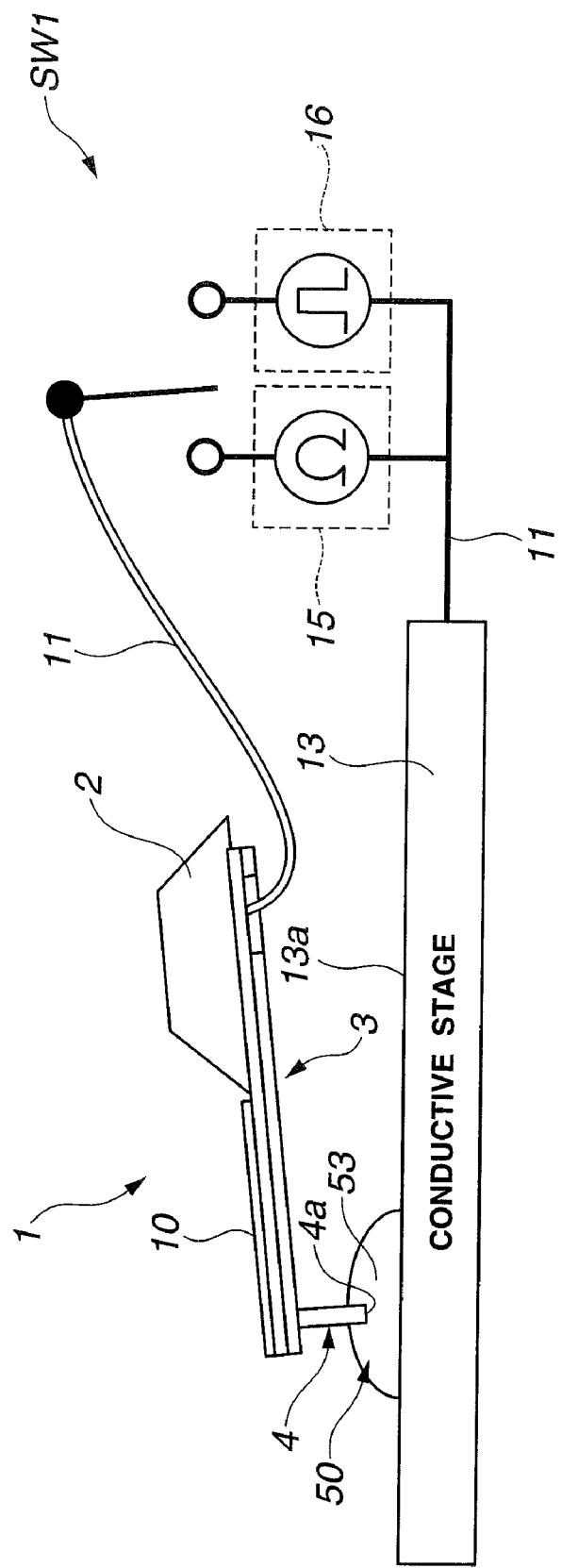
FIG. 20 is an illustrative view showing a state where the pulse generating unit is switched off to stop the application of the pulse wave electric potential after the probe portion is inserted into the cell in the third embodiment.
Figure 21:
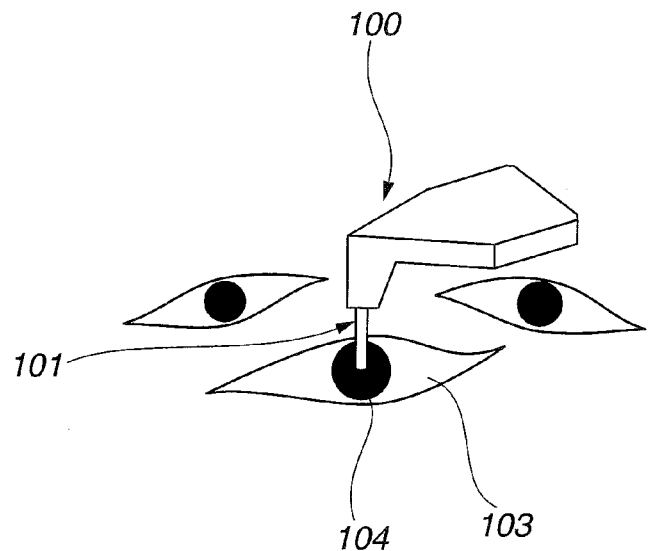
FIG. 21 is an illustrative view showing a cell puncturing operation using a needle-shaped material in a prior art.
Figure 22:
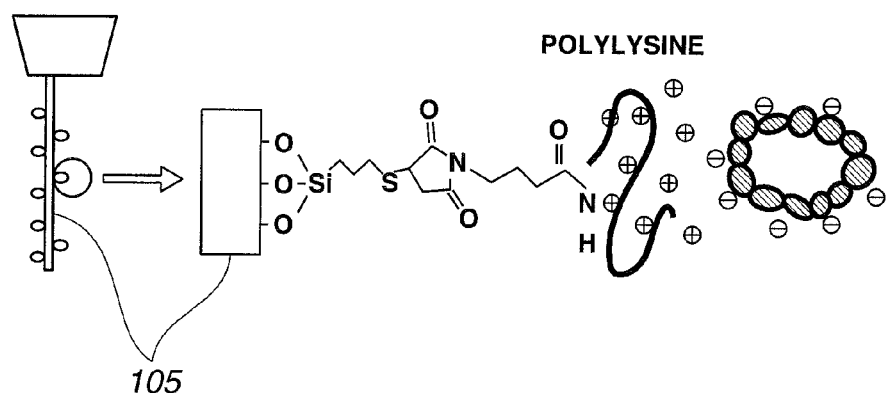
FIG. 22 is a schematic view showing a state where electrostatic adsorption is conducted on a polylysine-modified needle in a prior art.

FIGS. 18 to 20 relate to a third embodiment of the cantilever for measuring intra-cellular and inter-cellular microspaces of the present invention, and are illustrative views to describe a method to facilitate inserting the probe portion into the cell using a system including the cantilever. FIG. 18 shows a state where a resistance meter is switched on to measure the resistance between a conductive stage and the probe portion so as to detect contact between the probe portion and a cell membrane. FIG. 19 shows a state where a pulse generating unit is switched on to apply a pulse-like electric potential when contact between the probe portion and the cell membrane is detected. FIG. 20 shows a state where the pulse generating unit is switched off to stop the application of the pulse wave electric potential after the probe portion is inserted into the cell.

Note that, in FIGS. 18 to 20, components same as the cantilever 1 and those of the system of the first and second embodiments are attached with the same symbols, omitting descriptions thereof: only different parts are described.

The cantilever 1 and a system of the third embodiment, which are configured in generally the same manner as in the second embodiment, includes a resistance meter 15 and a pulse generating unit 16, replacing the power supply portion 14, and a switch SW1 for changing over between the resistance meter 15 and the pulse generating unit 16.

In other words, this configuration is provided such that contact between the probe portion 4 and the cell membrane can be detected through a measurement result by the resistance meter 15, and when such detection is made, the pulse generating unit 16 applies a pulse wave electric potential so as to better facilitate inserting the probe portion 4 into the cell 50.

Note that the switch SW1 is connected with the connection line 11 from the electrode pad 6 of the cantilever 1, such that, when the switch SW1 is changed over to the one terminal on the resistance meter 15 side, resistance between the conductive stage 13 and the probe portion 4 can be measured, while on the other hand, when changed over to the other terminal on the pulse generating unit 16 side, a pulse wave electric potential is applied between the conductive stage 13 and the probe portion 4.

Also note that switching off the switch SW1 can stop the application of the pulse wave electric potential from the pulse generating unit 16.

Now, referring to FIGS. 18 to 20, specifics of the method for inserting the probe portion 4 into the cell are described.

It is supposed that the operator now inserts the probe portion 4 of the cantilever 1 into the cell 50 using a system configured as shown in FIG. 18. The operator places in advance the cell 50 on the placement surface 13a of the conductive stage 13.

Then, with the power supply of the system turned on, the operator operates to change over the switch SW1 to one terminal on the resistance meter 15 side, as shown in FIG. 18. With resultant electrical connection between the conductive stage 13 and the probe portion 4 via the resistance meter 15, the operator measures the resistance between the conductive stage 13 and the probe portion 4 to detect contact between the probe portion 4 and the cell 50 (cell membrane 52).

Here, it is supposed that the probe portion 4 is brought into contact with the cell 50 by the operator's operation as shown in FIG. 19. In this case, the resistance meter 15 measures a predetermined resistance value between the conductive stage 13 and the probe portion 4, which allows detecting that the probe portion 4 is in contact with the cell 50.

If the resistance meter 15 detects that the probe portion 4 is in contact with the cell 50, the operator then operates to change over the switch SW1 to the other terminal on the pulse generating unit 16 side, as shown in FIG. 19.

As a result, the pulse generating unit 16 is switched on, causing application of a pulse wave electric potential between the conductive stage 13 and the probe portion 4.

With the pulse wave electric potential being applied, the operator moves the probe portion 4 of the cantilever 1 toward the cell 50 to insert the former into the latter. At this time, the application of the pulse wave electric potential to the conductive probe 7 of the probe portion 4 allows easily opening the cell membrane 52 (not shown) of the cell 50 to insert the conductive probe 7 into the cell 50.

Then, after confirming that the probe portion 4 of the cantilever 1 has reached the desired position in the cell 50, the operator switches off the switch SW1 to stop the application of the pulse wave electric potential from the pulse generating unit 16, as shown in FIG. 20.

Note that, in the third embodiment, the method for detecting the contact between the probe portion 4 and the cell 50 may employ a dynamic detection method to be conducted using the optical reflection film 10 of the cantilever 1, in stead of measuring the resistance between the conductive stage 13 and the probe portion 4 of the cantilever 1.

Further, the electric potential to be applied between the conductive stage 13 and the probe portion 4 of the cantilever 1 may be of either alternating current (high frequency) or direct current, and also may include both components of alternating and direct currents. Moreover, the electric potential to be applied between the conductive stage 13 and the probe portion 4 of the cantilever 1 may be a pulse potential containing a bias component of alternating or direct current.

Moreover, the pulse generating unit 16 may be switched on to apply the pulse wave electric potential even since before causing the probe portion 4 of the cantilever 1 to contact the cell 50.

Therefore, according to the third embodiment, it is possible not only to obtain the same effect as in the second embodiment, but also to easily insert the probe portion 4 of the cantilever 1 into the intra- and inter-cell 50 microspaces by applying an electric stimulation to the cell membrane 52 in addition to dynamically operating the cantilever 1 when inserting the probe portion 4 of the cantilever 1 into the cell 50. As a result, it is made possible to easily insert the probe portion 4 into the cell 50 even if the distal end portion of the probe portion 4 of the cantilever 1A has a relatively large diameter.

The present invention is not limited to the above-mentioned embodiments, but may be modified in various ways without departing from the spirit of the present invention.

Furthermore, an embodiment configured of appropriately combining parts of the above-mentioned embodiments also belongs to the present invention.

In this invention, it is apparent that working modes different in a wide range can be formed on this basis of this invention without departing from the spirit and scope of the invention. This invention is not restricted by any specific embodiment except being limited by the appended claims.

What is claimed is:

1. A cantilever system comprising:
   a cantilever, the cantilever comprising:
      a support portion;
      a lever portion provided on the support portion so as to protrude therefrom;
      a probe portion provided near a free end of the lever portion, the probe portion comprising a conductive probe, the conductive probe consisting of a material selected from the group consisting of single crystal diamond, polycrystalline diamond, nanodiamond, diamondlike carbon, amorphous carbon and combinations thereof, and an insulating film, the insulating film consisting of a material selected from the group consisting of polycrystalline diamond, nanodiamond, diamondlike carbon, amorphous carbon and combinations thereof to coat a periphery of the conductive probe, the conductive probe including a protruding portion protruded from the insulating film;
      an electrode pad provided on a proximal end portion on the support portion side of the lever portion; and
      a wiring portion to electrically connect the conductive probe and the electrode pad through the lever portion;
   a conductive stage comprising a conductive member having a placement surface on which a cell is placed;
   a resistance meter for measuring a resistance between the probe portion and the conductive stage to detect contact between the probe portion and the cell;
   a pulse generating unit for applying a pulse current between the electrode pad and the conductive stage when the probe portion is to be inserted into the cell; and
   a switch for changing over between the resistance meter and the pulse generating unit.

2. The cantilever system according to claim 1, wherein the protruding portion is subjected to a surface treatment comprising hydrogen, oxygen, fluorine, amino acid, silane, organic molecules, biological molecules and combinations thereof.

3. The cantilever system according to claim 2, wherein the probe portion has a length of greater than 2 µm and has a distal end portion with a diameter of less than 1 µm.

4. A cantilever system comprising:
   a cantilever, the cantilever comprising:
      a support portion;
      a lever portion provided on the support portion so as to protrude therefrom;
      a probe portion provided near a free end of the lever portion, the probe portion comprising a conductive probe, the conductive probe consisting of a material selected from the group consisting of single crystal diamond, polycrystalline diamond, nanodiamond, diamondlike carbon, amorphous carbon and combinations thereof, and an insulating film, the insulating film consisting of a material selected from the group consisting of polycrystalline diamond, nanodiamond, diamondlike carbon, amorphous carbon and combinations thereof to coat a periphery of the conductive probe, the conductive probe including a protruding portion protruded from the insulating film;
      an electrode pad provided on a proximal end portion on the support portion side of the lever portion;
      a wiring portion to electrically connect the conductive probe and the electrode pad through the lever portion;
   a conductive stage comprising a conductive member having a placement surface on which a cell is placed;
   a power supply portion including a first power supply for applying an electropositive potential to the probe portion inserted into the cell and a second power supply for applying a negative potential to the probe portion; and
   a switch for changing over between the first power supply and the second power supply.

5. The cantilever system according to claim 4, wherein the protruding portion is subjected to a surface treatment comprising hydrogen, oxygen, fluorine, amino acid, silane, organic molecules, biological molecules and combinations thereof.

6. The cantilever system according to claim 5, wherein the probe portion has a length of greater than 2 µm and has a distal end portion with a diameter of less than 1 µm.

* * * * *